(12) United States Patent
Kavranoglu

(10) Patent No.: US 9,384,212 B2
(45) Date of Patent: Jul. 5, 2016

(54) GEOGRAPHIC IDENTIFICATION SYSTEM

(71) Applicant: Davut Kavranoglu, Istanbul (TR)

(72) Inventor: Davut Kavranoglu, Istanbul (TR)

(*) Notice: Subject to any disclaimer, the term of this patent is extended or adjusted under 35 U.S.C. 154(b) by 0 days.

(21) Appl. No.: 14/598,123

(22) Filed: Jan. 15, 2015

(65) Prior Publication Data

US 2015/0134241 A1     May 14, 2015

Related U.S. Application Data

(63) Continuation of application No. 12/833,842, filed on Jul. 9, 2010, now abandoned.

(60) Provisional application No. 61/224,786, filed on Jul. 10, 2009, provisional application No. 61/293,671, filed on Jan. 10, 2010.

(51) Int. Cl.
*G06F 17/00* (2006.01)
*G06F 17/30* (2006.01)
*G01C 21/00* (2006.01)

(52) U.S. Cl.
CPC .......... *G06F 17/30241* (2013.01); *G01C 21/00* (2013.01); *G06F 17/30265* (2013.01); *G06F 17/30268* (2013.01)

(58) Field of Classification Search
CPC ................... G06F 17/30265; G06F 17/30268; G01C 21/00
USPC ........... 701/532, 533; 707/7, 102, 104.1, 706, 707/711–724; 715/513; 709/217
See application file for complete search history.

(56) References Cited

U.S. PATENT DOCUMENTS 5,852,810 A * 12/1998 Sotiroff et al. ............... 705/26.8
6,101,496 A   8/2000 Esposito
(Continued)

FOREIGN PATENT DOCUMENTS

WO   2006028478 A1   3/2006
WO   2011004265 A1   1/2011

OTHER PUBLICATIONS

Lv, Xuefeng et al., "A Kind of Spatial Data Storage System Based on Global Subdivision Theory for Mobile GIS", Wireless Communications, Networking and Mobile Computing, 2009. WICOM '09. 5th International Conference on IEEE, Piscataway, NJ, USA, Sep. 24, 2009, pp. 1-4.

(Continued)

*Primary Examiner* — Thomas Tarcza
*Assistant Examiner* — Tyler J Lee
(74) *Attorney, Agent, or Firm* — KPPB LLP

(57) ABSTRACT

Geographic identification systems and methods of displaying geographic locations on maps and providing related location based services in accordance with embodiments of the invention are disclosed. One embodiment includes a GEOID server configured to communicate with a database containing GEOIDs, where each GEOID comprises a label and geographic information. In addition, the GEOID server is configured to communicate with a mapping server via a network, the GEOID server is configured to communicate with a plurality of user devices via the network, the GEOID server is configured to store GEOIDs in the database in response to information received from user devices via the network, the GEOID server is configured to retrieve geographic information in response to GEOID labels received from user devices via the Internet, and the GEOID server is configured to cause the display of a map provided by a mapping server on a user device, where the map indicates at least one location associated with the geographic information retrieved by the GEOID server in response to the GEOID label received from the user device.

19 Claims, 13 Drawing Sheets

(56) References Cited

U.S. PATENT DOCUMENTS

| | | | |
|---|---|---|---|
| 6,414,635 | B1 | 7/2002 | Stewart et al. |
| 6,912,545 | B1 | 6/2005 | Lundy et al. |
| 7,231,405 | B2 | 6/2007 | Xia |
| 7,403,939 | B1 | 7/2008 | Virdy |
| 7,774,342 | B1 | 8/2010 | Virdy |
| 7,801,542 | B1 | 9/2010 | Stewart |
| 7,917,154 | B2 | 3/2011 | Fortescue et al. |
| 8,064,928 | B2 | 11/2011 | Venkatachalam |
| 8,166,025 | B1 | 4/2012 | Virdy |
| 8,200,694 | B1 | 6/2012 | Diligenti et al. |
| 8,554,245 | B2 | 10/2013 | Stewart |
| 2001/0011270 | A1 | 8/2001 | Himmelstein |
| 2002/0078035 | A1 | 6/2002 | Frank |
| 2002/0173981 | A1 | 11/2002 | Stewart |
| 2005/0192999 | A1 | 9/2005 | Cook et al. |
| 2005/0234991 | A1 | 10/2005 | Marx |
| 2006/0089160 | A1 | 4/2006 | Othmer |
| 2007/0032244 | A1 | 2/2007 | Counts et al. |
| 2008/0195308 | A1* | 8/2008 | Sloo ............... G06F 30/02 701/454 |
| 2009/0100185 | A1 | 4/2009 | Sheha et al. |
| 2010/0151821 | A1 | 6/2010 | Sweeney et al. |
| 2010/0317371 | A1 | 12/2010 | Westerinen et al. |
| 2011/0010092 | A1 | 1/2011 | Kavranoglu |
| 2011/0137996 | A1 | 6/2011 | Stewart |
| 2013/0325903 | A1* | 12/2013 | Rohlf et al. ............... 707/797 |

OTHER PUBLICATIONS

Roth, J., "Accessing Location Data in Mobile Environments—The Nimbus Location Model", Mobile and Ubiquitous Information Access; Springer-Verlag, Berlin/Heidelberg, vol. 2954, Jan. 4, 2007, pp. 256-270.

Sadoun, et al., "Location based services using geographical information systems", Computer Communications, Elsevier Science Publishers BV, Amsterdam, NL, Oct. 13, 2007, pp. 3154-3160.

Shi, X., "Python for Internet GIS Applications", Computing in Science and Engineering, IEEE Service Center, Los Alamitos, CA. US, vol. 9, No. 3, May 1, 2007, pp. 56-59.

International Search Report and Written Opinion for International Application No. PCT/IB2010/0019722, Search completed Dec. 7, 2010, Mailed Dec. 16, 2010, 12 Pgs.

International Preliminary Report on Patentability for International Application No. PCT/IB2010/0019722, Issued Jan. 10, 2012, 7 Pgs.

* cited by examiner

GEOGRAPHIC IDENTIFICATION SYSTEM

CROSS-REFERENCE TO RELATED APPLICATIONS

The current application is a continuation of U.S. patent application Ser. No. 12/833,842, entitled "Geographic Identification System," filed Jul. 9, 2010, which application claims priority under 35 U.S.C. §119(e) to U.S. Provisional Application No. 61/224,786, entitled "Geographic Identification System", filed Jul. 10, 2010, and to U.S. Provisional Application No. 61/293,671, entitled "Geographic Identification System for Mobile Destinations" filed Jan. 10, 2010. The disclosures of U.S. patent application Ser. No. 12/833, 842 and U.S. Provisional Application Nos. 61/224,786 and 61/293,671 are incorporated herein by reference in their entirety.

FIELD OF THE INVENTION

The present invention relates to mapping services and more specifically to the manner in which mapping services identify geographic locations.

BACKGROUND

Web mapping services and applications, such as the Google Maps service provided by Google, Inc. of Mountain View, Calif., power various web sites such as the Google Maps website and other web sites and mobile applications that access the mapping service via Application Programming Interfaces (APIs). Such mapping services are extremely popular in the provision of navigation and location based services to users of desktop computers, laptop computers, mobile devices, and other Internet connected consumer electronic devices. The ability to access mapping services via mobile devices has resulted in mobile devices commonly being used while driving for navigation purposes. While many devices include audio turn-by-turn directions to limit the extent to which a driver is distracted while using the device, the input of information into the device while driving is cumbersome and can distract a driver's attention from the operation of the vehicle. The problem of distracted attention can be particularly acute when a driver is entering a street address, which can include a street name, street number, city, state and/or zip code. Furthermore, mapping services often include unreliable information. Therefore, entry of an address can occasionally lead to wrong positioning and incorrect navigation information.

Even when the operator of a mobile device is not driving, entering an address into a mobile device can be cumbersome and frustrating due to the inherent limitations of the user interface of the device. One solution is to access the address on a device with a more sophisticated user interface such as a personal computer and then to send a link to the address to the mobile device.

SUMMARY OF THE INVENTION

Geographic identification systems and methods for efficiently representing geographic locations for retrieval by mapping services are described. Systems and methods in accordance with embodiments of the invention address a need to be able to more efficiently represent geographic locations and to verify the accuracy of an address associated with a geographic location.

One embodiment includes a GEOID server configured to communicate with a database containing GEOIDs, where each GEOID comprises a label and geographic information. In addition, the GEOID server is configured to communicate with a mapping server via a network, the GEOID server is configured to communicate with a plurality of user devices via the network, the GEOID server is configured to store GEOIDs in the database in response to information received from user devices via the network, the GEOID server is configured to retrieve geographic information in response to GEOID labels received from user devices via the Internet, and the GEOID server is configured to cause the display of a map provided by a mapping server on a user device, where the map indicates at least one location associated with the geographic information retrieved by the GEOID server in response to the GEOID label received from the user device.

In a further embodiment, the geographic information of at least one GEOID is a static geographic location.

In another embodiment, the static geographic information is expressed as a latitude and longitude on the surface of the Earth.

In a still further embodiment, the static geographic information is expressed as a street address comprising a street address and a postal code.

In still another embodiment, the geographic information of at least one GEOID is a plurality of static geographic locations.

In a yet further embodiment, the geographic information of at least one GEOID is a route.

In yet another embodiment, the geographic information of at least one GEOID is information identifying a mobile asset.

In a further embodiment again, the mobile asset is a mobile phone handset.

In another embodiment again, the mobile asset is a parcel.

In a further additional embodiment, the mobile asset is a vehicle including an automatic vehicle location system.

In another additional embodiment, the GEOID server is configured to use the retrieved geographic information to obtain a location update for the mobile asset.

In a still yet further embodiment, the mobile asset includes a client application configured to determine the current location of the mobile asset and to communicate the current location of the mobile asset to the GEOID server.

In still yet another embodiment, the GEOID server is configured to communicate with a tracking server via the network, and the GEOID server is configured to obtain a location update for the mobile asset from the tracking server using the retrieved geographic information.

In a still further embodiment again, the geographic information of at least one GEOID is information identifying a plurality of mobile assets.

In still another embodiment again, the geographic information of at least one GEOID is references another GEOID.

In a still further additional embodiment, the GEOID server is configured to verify that the user device from which a GEOID label is received has permission to access the geographic information associated with the GEOID label.

In still another additional embodiment, the GEOID server is configured to compare a PIN code received from the user device to a PIN code associated with the GEOID in the database.

In a yet further embodiment again, the GEOID server is configured to determine whether the user device from which the GEOID label is received is associated with a user that has been assigned permission to access the geographic information associated with the GEOID by the user that created the GEOID.

In yet another embodiment again, each GEOID is unique and labels only one set of geographic information.

In a yet further additional embodiment, the GEOID is uniquely assigned within different geographies.

In yet another additional embodiment, the GEOID expires after a predetermined time period.

In a further additional embodiment again, at least one GEOID comprises at least one set of non-geographic information in addition to the geographic information.

An embodiment of the method of the invention includes receiving a label for association with a piece of geographic information, determining that the label is available for use, receiving at least one piece of geographic information for association with the label, where the piece of geographic information is longer than the label, and storing the label and the at least one piece of geographic information in a database for retrieval using the label.

In a further embodiment of the method of the invention, the geographic information is a static geographic location.

In another embodiment of the method of the invention, the static geographic information is expressed as a latitude and longitude on the surface of the Earth.

In a still further embodiment of the method of the invention, the static geographic information is expressed as a street address comprising a street address and a postal code.

In still another embodiment of the method of the invention, the geographic information is a plurality of static geographic locations.

In a yet further embodiment of the method of the invention, the geographic information is a route.

In yet another embodiment of the method of the invention, the geographic information is information identifying a mobile asset.

In a further embodiment again of the method of the invention, the geographic information is information identifying a plurality of mobile assets.

In another embodiment again of the method of the invention, the geographic information is a label of another piece of geographic information.

A further additional embodiment of the method of the invention also includes defining access permissions restricting the retrieval of the stored geographic information using the label.

Another additional embodiment of the method of the invention also includes defining an expiration date for the label and storing the expiration date with the label and the at least one piece of geographic information in the database for retrieval.

A still yet further embodiment of the method of the invention also includes receiving at least one piece of non-geographic information, and storing the at least one piece of non-geographic information in the database for retrieval using the label.

Still yet another embodiment of the method of the invention includes providing the label, querying the database using the label, retrieving the geographic information associated with the label in the database, and displaying a map including an indication of at least one geographic location derived using the geographic information retrieved using the label.

In a still further embodiment again of the method of the invention, the geographic information is a static geographic location.

In still another embodiment again of the method of the invention, the geographic information is a plurality of static geographic locations.

In a still further additional embodiment of the method of the invention, the geographic information is a route.

In another additional embodiment of the method of the invention, the geographic information is information identifying a mobile asset.

In a yet further embodiment again of the method of the invention, the geographic information is information identifying a plurality of mobile assets.

In yet another embodiment again of the method of the invention, the geographic information is another label.

A further additional embodiment again of the method of the invention also includes determining whether the user providing the label is permitted to access the geographic information associated with the label.

Another additional embodiment again of the method of the invention also includes comparing a PIN code provided by the user with a PIN code associated with the label in the database.

A still yet further embodiment again of the method of the invention also includes querying whether a record exists that the user has been granted permission to access the geographic information by the user that caused the geographic information to be stored in the database.

Another further embodiment of the invention includes a GEOID server configured to communicate with a database containing GEOIDs, where each GEOID comprises a label and geographic information. In addition, the GEOID server is configured to communicate with a mapping server via a network, the GEOID server is configured to communicate with a plurality of user devices via the network, the GEOID server is configured to retrieve geographic information in response to GEOID labels received from user devices via the Internet, and the GEOID server is configured to cause the display of a map provided by a mapping server on a user device, where the map indicates at least one location associated with the geographic information retrieved by the GEOID server in response to the GEOID label received from the user device.

DETAILED DISCLOSURE OF THE INVENTION

Turning now to the drawings, geographic identification systems and methods of displaying geographic locations on maps and providing related location based services in accordance with embodiments of the invention are illustrated. The geographic location of an object can be expressed via any of a number of different coordinate systems including but not limited to latitude and longitude on the surface of the Earth, and/or a street address including a street address, a city, and/or a postal or ZIP code. The term "geographic identification", which can be shortened to GEOID, includes an alphanumerical label (GEOID label), which may be unique, and a set of specific geographic information assigned to aforementioned GEOID label. The set of geographic information includes but is not limited to one or more static geographic locations, one or more routes, and/or information identifying one or more mobile assets. The geographic location to which the GEOID label points, can be a fixed geographic location or the present geographic location of a mobile object or entity. In many embodiments, the GEOID label can point to multiple geographic locations and/or mobile objects or entities so that a user can locate the geographic location closest to a particular location. Geographic identification systems in accordance with embodiments of the invention provide users with the ability to define GEOIDs that can then be shared with other users. In this way, a user can choose an efficient and easy to remember GEOID label that the geographic identification system can map to a specific location or route. The GEOID can then be used to display the geographic location or route via a mapping service, and to provide additional location based services such as, but not limited to, turn-by-turn navigation services from a location to the location of the GEOID or the start of the route. Geographic information systems and methods of using GEOIDs to provide services in accordance with embodiments of the invention are discussed further below.

Geographic Identification Systems

Figure 1:
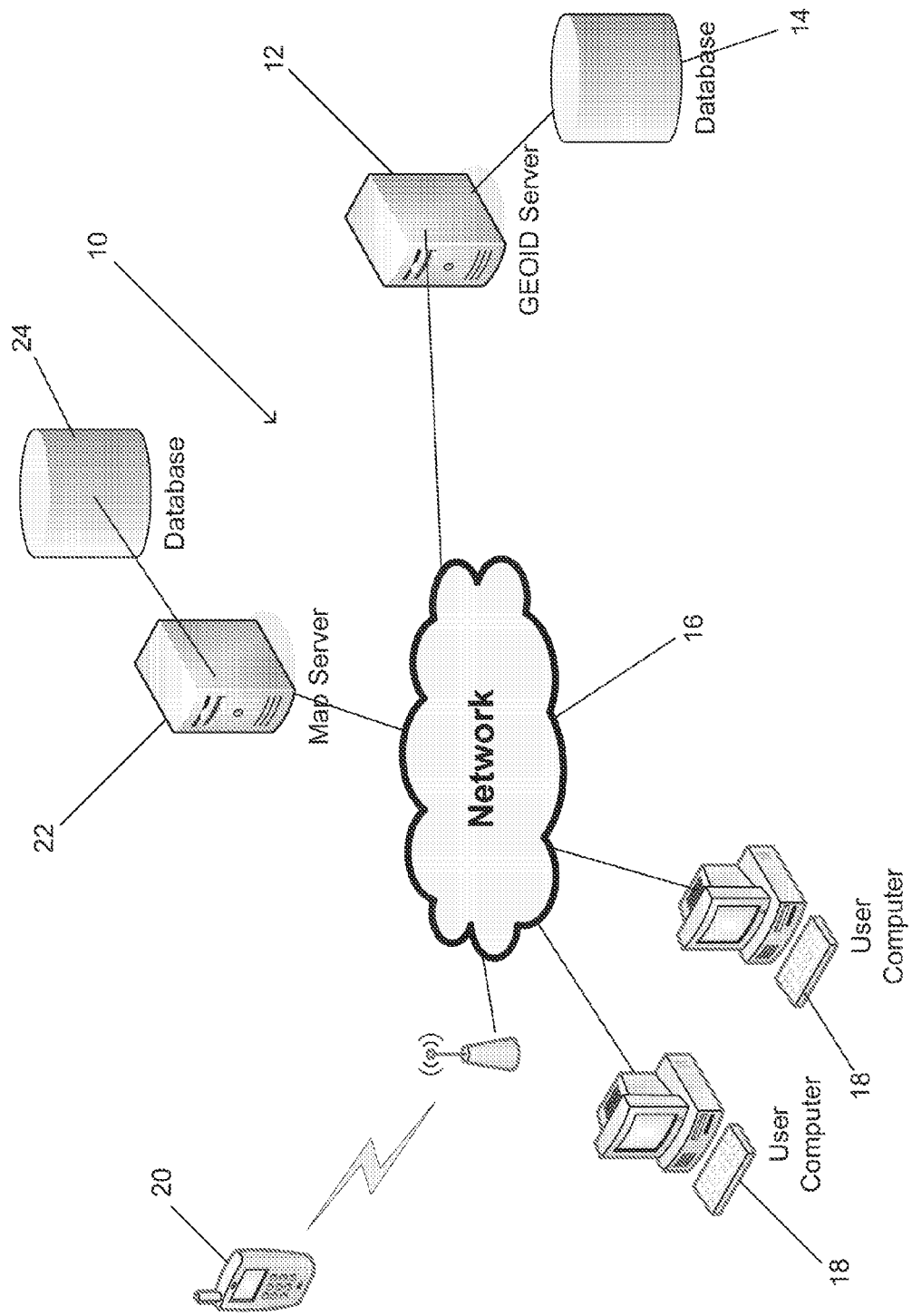
FIG. 1 illustrates the network topology of a geographic identification system in accordance with an embodiment of the invention.

A geographic identification system in accordance with an embodiment of the invention is illustrated in FIG. 1. The geographic identification system (or GEOID network) 10 includes a GEOID server 12, which is connected to a database 14 containing information concerning various GEOIDs that have been defined by users. The GEOID server 12 is configured to communicate via a network 16, such as the Internet, with a variety of different user devices. In the illustrated embodiment, the user devices include user computers 18 and mobile handsets 20. The user devices with which a GEOID server 12 can communicate in accordance with an embodiment of the invention are in no way limited to these devices and in many embodiments, GEOID servers communicate with a wide array of network connected computing devices and consumer electronics. The GEOID server 12 is also configured to communicate via the network with a Map Server 22. In the illustrated embodiment, the Map Server 22 is connected to a database 24 containing map data. The Map Server 22 and database 24 are simply one example of a mapping service. In other embodiments, the GEOID server can communicate with any of a variety of different mapping services.

In operation, users can communicate with the GEOID server 12 via various user devices and are able to define GEOIDSs that are stored in the database 14 for later retrieval. The GEOID typically is a label that references a position, route or another GEOID. The label of the GEOID can be unique, but as is discussed below reuse of GEOID labels can be permitted under specified circumstances. The label itself can be assigned by a user or assigned by the geographic identification system and is typically characterized in that that it is simple to remember (e.g. "Home" or "Work") or is shorter than the address or tracking information associated with the GEOID (e.g. a 16 character tracking code can be replaced with a 5 character code). In many embodiments, the user defines the GEOID first. Once the GEOID has been indicated as available, the user can then associate geographic information and other types of information with the GEOID. In other embodiments, the user identifies the geographic information and/or other types of information first and then the user can attempt to assign a GEOID to the information. The GEOIDs are retrieved, when a user specifies a geographic location using a GEOID. The GEOID is forwarded to the GEOID server 12 and the appropriate location information is retrieved from the database 14. In a number of embodiments, the GEOID server provides a geographic location and/or a URL enabling the display of the geographic location via a mapping service. The application on the user device that provided the GEOID to the GEOID server can then replace the GEOID with the URL and display a map showing the geographic location of the GEOID via the web service. In several embodiments, the GEOID provides services in addition to the translation of GEOIDs into geographic locations or URLS, a GEOID server in accordance with embodiments of the invention can also provide additional services including, but not limited to, forwarding the geographic location to a mapping service to display the geographic location on a map. In several embodiments, the geographic location is forwarded via an API defined by the mapping service such as the Google Maps API defined by Google, Inc. of Mountain View, Calif. In other embodiments, any of a variety of techniques can be used to retrieve map information from mapping services. Furthermore, many embodiments of the invention incorporate a dedicated mapping service. In addition to displaying the geographic location on a map, the GEOID server can also provide additional location based services including, but not limited to, turn-by-turn navigation, and location based advertising.

In a number of embodiments, geographic identification systems support two different categories of users: personal users and corporate/government users. Personal users are typically able to utilize the geographic information system without any service fee. Corporate/government users can also utilize the geographic identification system based on a service contract. In this way the database of the geographic identification system can be made accessible to corporate/government users to use GEOIDs that they create to provide services. Geographic identification systems in accordance with embodiments of the invention can also support two different categories of subscribers: personal subscribers and corporate/government subscribers. Personal subscribers utilize the geographic identification system for personal usage, including but not limited to defining GEOIDs for the home, work, and meeting places. Corporate/government subscribers can register their locations and offices as GEOIDS for a fee. In other embodiments, any of a variety of different classes of users and/or subscribers can be defined within a geographic identification system.

Figure 2:
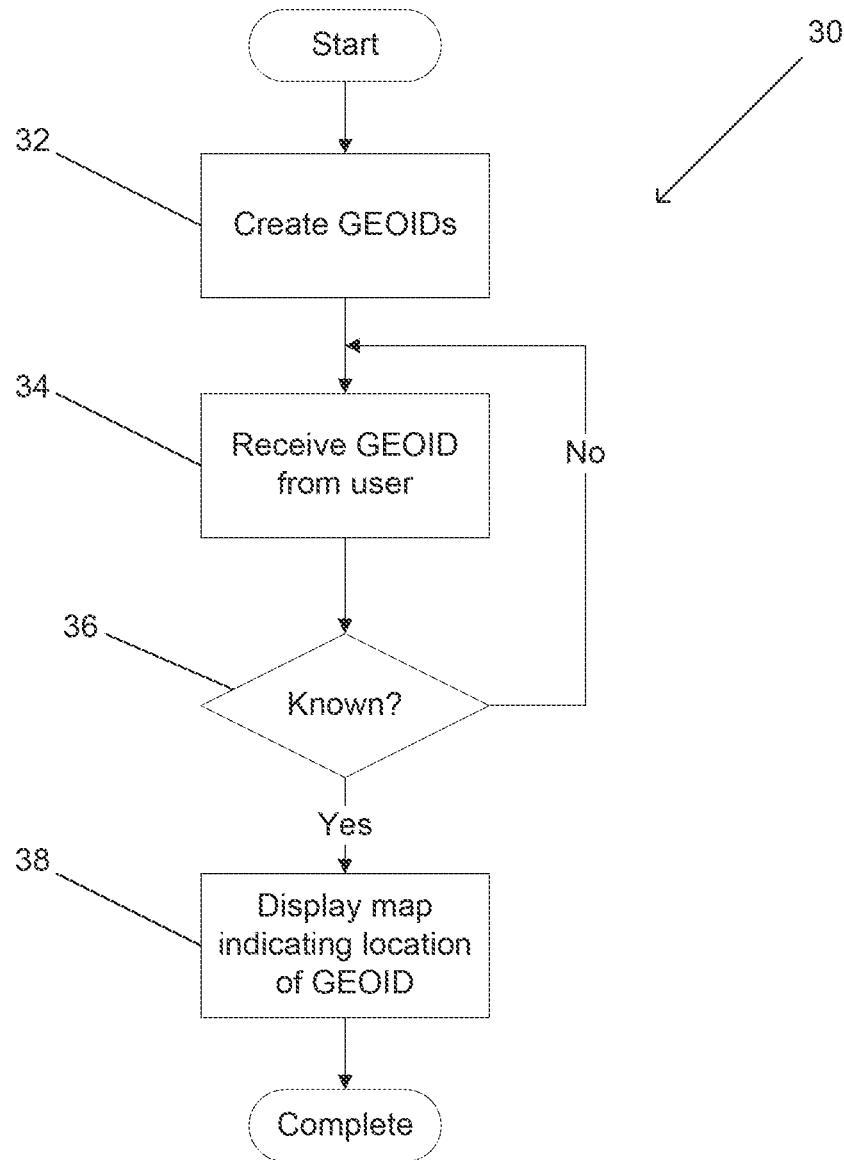
FIG. 2 is a flow chart illustrating a process for using a geographic identification system to display locations on maps based upon geographic identifications provided by users in accordance with an embodiment of the invention.

A process for displaying geographic locations on maps in response to GEOIDs provided by users to a geographic identification system in accordance with embodiments of the invention is illustrated in FIG. 2. The process 30 commences with the creation (32) of at least one GEOID by a user or the operator of the GEOID service, where the GEOID defines a geographic location. As noted above, a GEOID can refer to a static geographic location or route or to the present location of a mobile object or entity. FIGS. 2-5 illustrate GEOIDs in the context of static geographic locations. Systems and methods that handle GEOIDs, which reference mobile objects and/or entities are discussed with respect to FIGS. 6-10b below. GEOIDs can also represent other GEOIDs. As is discussed further below, different privacy permissions can be assigned to different GEOIDs. Therefore, a GEOID that is shared amongst friends can reference another public GEOID. In this way, friends can be provided with a GEOID that is easier to remember than the generally available and more complex GEOID published for general use. Once GEOIDs have been defined, users can request (34) the retrieval of the geographic location associated with specific GEOIDs. In the event that the GEOID is known (36), the GEOID is retrieved and in a number of embodiments the geographic location associated with the GEOID is displayed (38) on a map.

The process illustrated in FIG. 2 is simply one high level illustration of the manner in which GEOIDs can be defined and used to retrieve geographic locations for display on a map and/or other purposes. Various processes for defining and displaying the geographic location of GEOIDs using geographic information systems in accordance with embodiments of the invention are discussed below.

Defining Geographic Identifications

Figure 3:
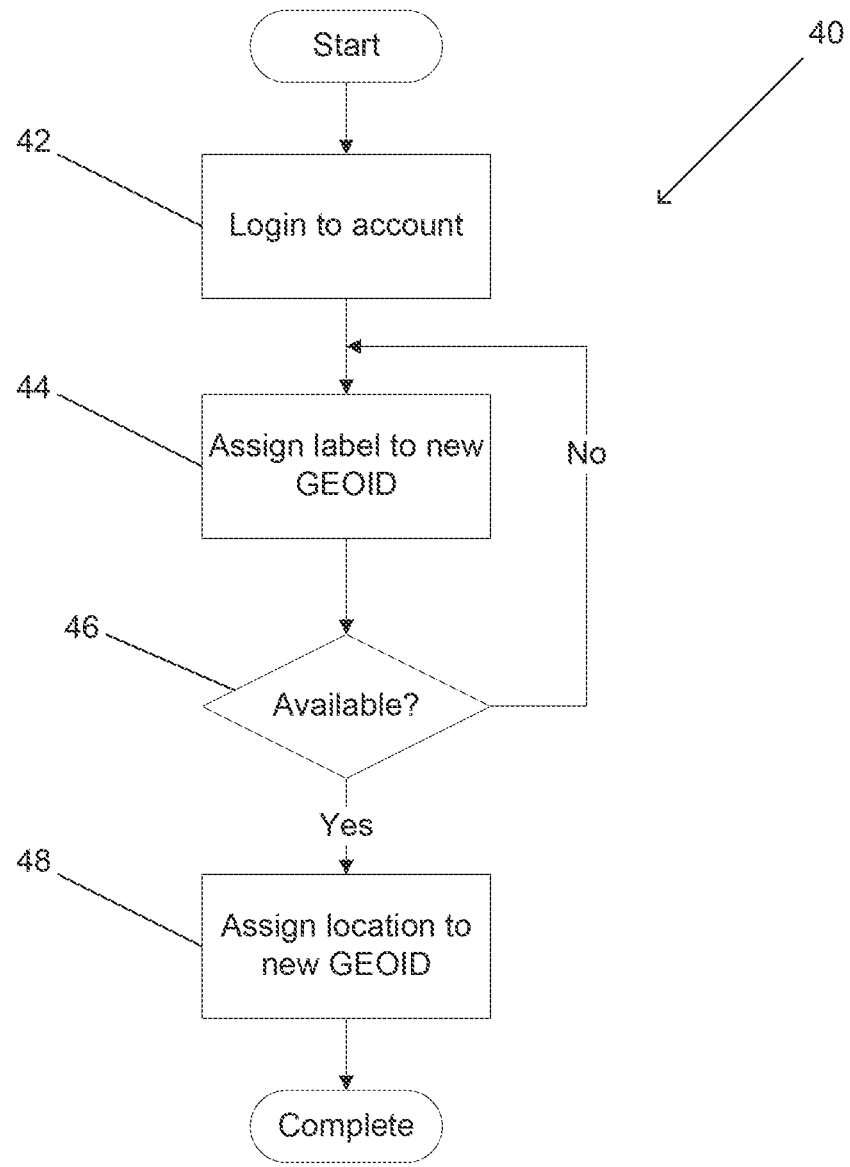
FIG. 3 is a flow chart illustrating a process for creating a geographic identification in accordance with an embodiment of the invention.

A variety of processes exist for creating GEOIDs from simply randomly generating GEOIDs to allowing users to specify the GEOID to assign to one or more geographic locations. A process for defining a GEOID in accordance with an embodiment of the invention is illustrated in FIG. 3. In the illustrated embodiment, the process 40 commences when a user logs (42) into an account. In many embodiments, however, users can create GEOIDs without registering with the geographic information system. To create the GEOID, the user specifies (44) a label for the GEOID and a determination is made (46) concerning whether the GEOID is available. In the event the GEOID is already in use, the user is prompted for another GEOID. When the GEOID is available, the user can then provide (48) geographic information to assign to the GEOID. Note that the embodiment illustrated in FIG. 2 involves the user selecting a GEOID prior to selecting geographic information. Selecting the GEOID first and then assigning geographic information to the GEOID can provide a number of advantages. In other embodiments, however, the geographic information can be selected prior to the selection of a GEOID. Typically, additional geographic information and/or other information can be assigned to a GEOID after its initial creation. The geographic information can be one or more locations that are provided by indicating a location on a map, providing a latitude, longitude and/or altitude coordinate or another type of coordinate, and/or specifying a street address. The GEOID can then be stored to complete the process. In many embodiments, additional information is stored with the GEOID including but not limited to the identity of the user that created the GEOID, the name of the location/point of interest, a picture, an audio clip, and/or a video clip.

In the process illustrated in FIG. 3, the user specifies the GEOID. As noted above, a geographic identification system in accordance with embodiments of the invention can also randomly or automatically generate GEOIDs in response to a user providing one or more geographic locations to the geographic information system.

Geographic identification systems in accordance with several embodiments of the invention support GEOID label reuse (i.e. the ability of a specific label to be separately assigned to different GEOIDs) Reuse can be in the context of different geographic regions. For example, a GEOID label can be reused across different states of the United States. A GEOID label can also be reused based upon privacy settings. For example, when an individual defines a GEOID and shares the GEOID label with friends, the GEOID label can be made available for use by other unrelated users. The privacy settings associated with the GEOID can be explicit, involving the use of a password or PIN code to access the geographic location associated with the GEOID. Alternatively, the privacy settings associated with the GEOID can be implicit, involving the user granting permission to specific users to access the GEOID. Implicit grants of access can automatically occur when GEOIDs are defined in the context of an online social network.

Figure 4A:
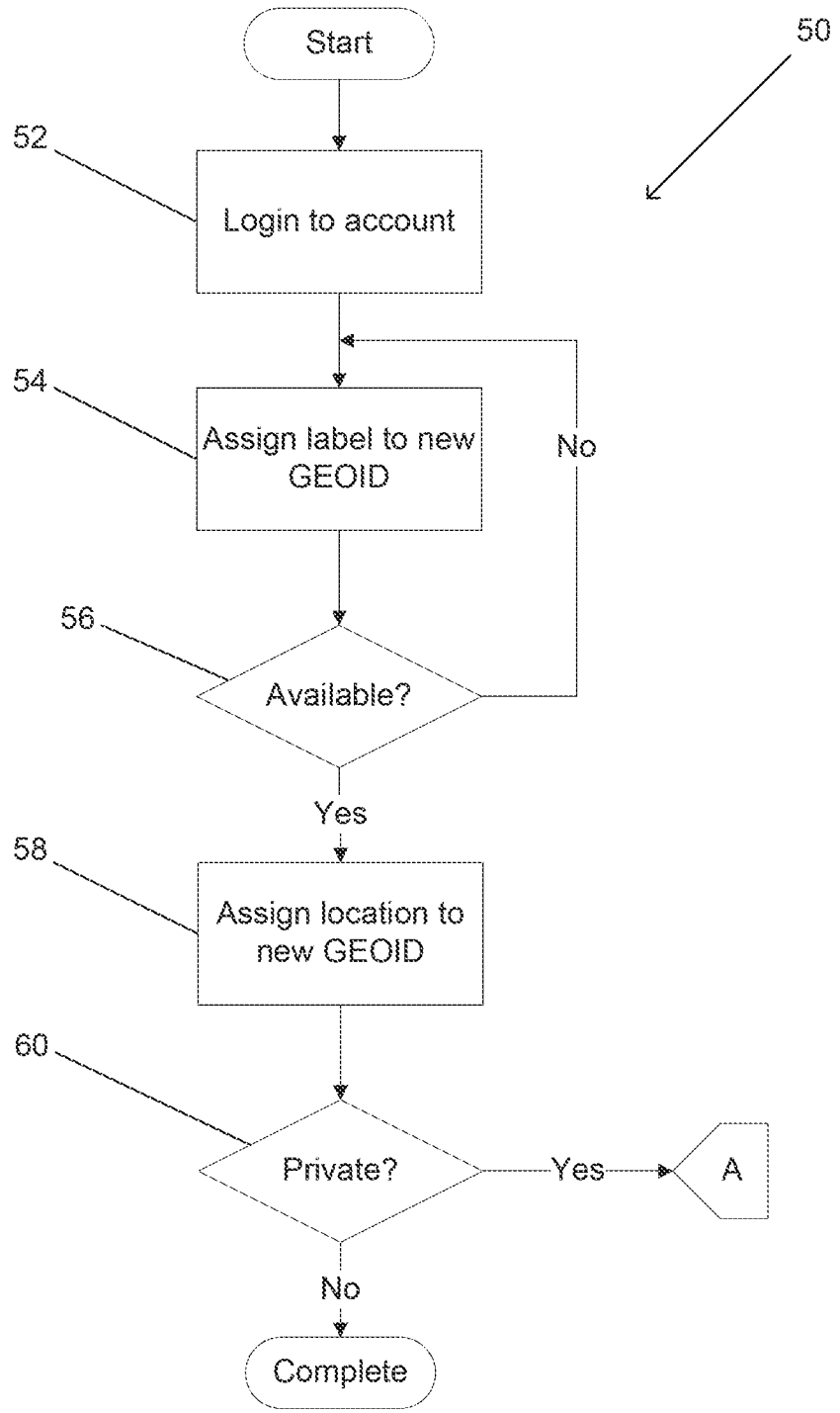
FIGS. 4a and 4b are flow charts illustrating a process for creating a private geographic identification in accordance with an embodiment of the invention.
Figure 4B:
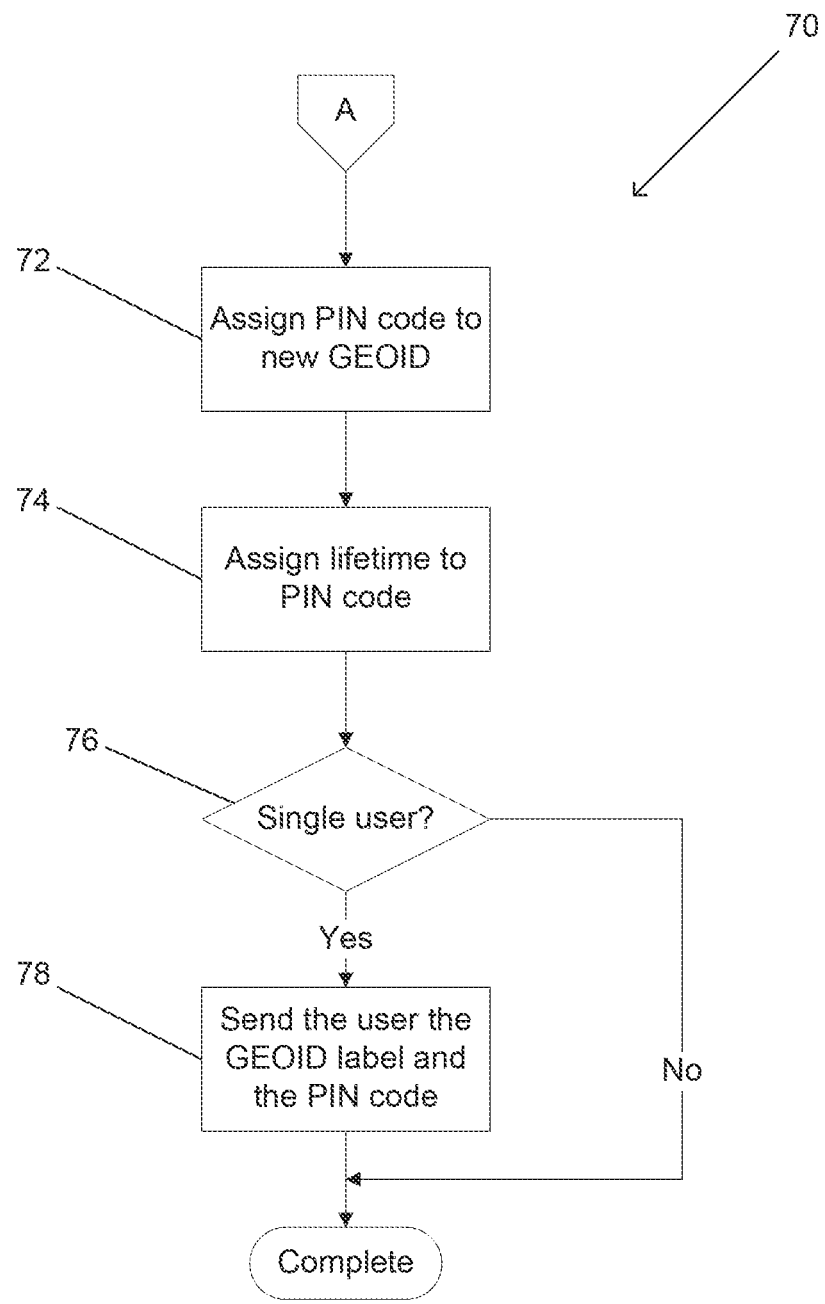

A process for defining a private GEOID that is accessible via a PIN code in accordance with an embodiment of the invention is illustrated in FIGS. 4a and 4b. The process 50 is similar to the process 40 illustrated in FIG. 3 involving logging in (52) to an account, assigning (54) a label to the GEOID where available (56), and then associating a geographic (58) location with the label. The process 50 differs in the respect that a determination (60) is made whether the GEOID is a private GEOID or a public GEOID. In the event that the GEOID is public, then the process completes and the GEOID is saved for subsequent retrieval. In the event that the GEOID is private, the user is able to assign (72) a PIN code or password to the GEOID. In many embodiments, the user can also assign (74) a lifetime to the GEOID or the PIN code after which either the GEOID or the PIN code or both will expire. In a number of embodiments, the process determines (76) whether the GEOID is intended for a single user. If so, the process can send (78) the GEOID and the PIN code to the user via mechanisms including but not limited to email or SMS. Otherwise, the process completes by saving the GEOID for subsequent retrieval. Although a specific process for assigning a PIN code is illustrated in FIG. 4b, other processes appropriate to a specific application can also be utilized in accordance with embodiments of the invention.

Figure 4C:
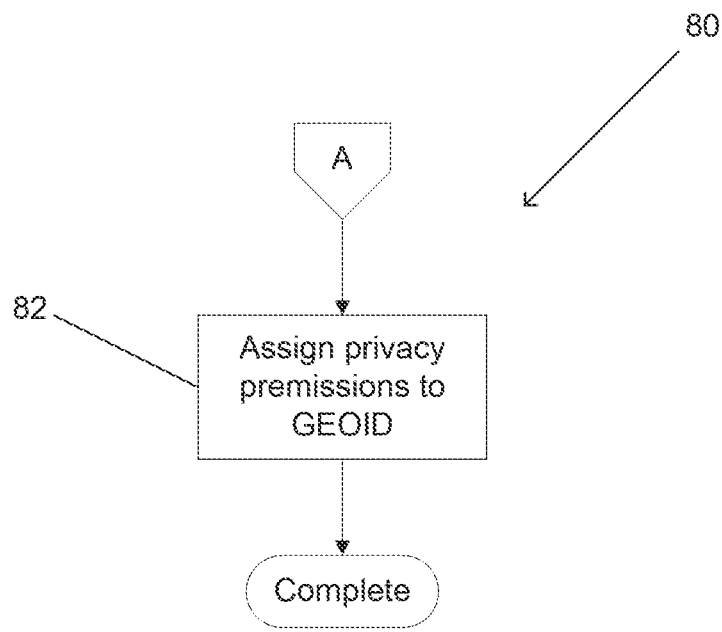
FIG. 4c is a flow chart illustrating an alternative process for creating a private geographic identification in accordance with an embodiment of the invention.

A process for defining a private GEOID that is accessible based upon permissions granted to other users in accordance with embodiments of the invention is illustrated in FIGS. 4a and 4c. The process utilizes the same initial process 50 illustrated in FIG. 4a, but the process 70 for assigning a PIN code illustrated in FIG. 4b is replaced with the process 80 shown in FIG. 4c involving the association (82) of privacy permissions with the GEOID. The privacy permissions may indicate that the geographic location(s) associated with the GEOID is accessible to a group of users (e.g. users associated with the user that defined the GEOID such as "friends" within an online social network), or accessible to other individual users only. The process shown in FIG. 4c only involves applying privacy permissions to private GEOIDs, however, processes in accordance with embodiments of the invention can also assign a "public" privacy permission to a public GEOID so that all of the GEOIDs have associated privacy permissions.

Although specific examples of GEOID reuse and privacy control/access permissions are disclosed above, any of a variety of techniques can be utilized for determining the ability of different users to assign a specific GEOID label to a geographic location and the extent to which the GEOID is shared between the general public, groups of users, and/or other individual users.

Accessing Geographic Location Information using GEOIDs

Figure 5:
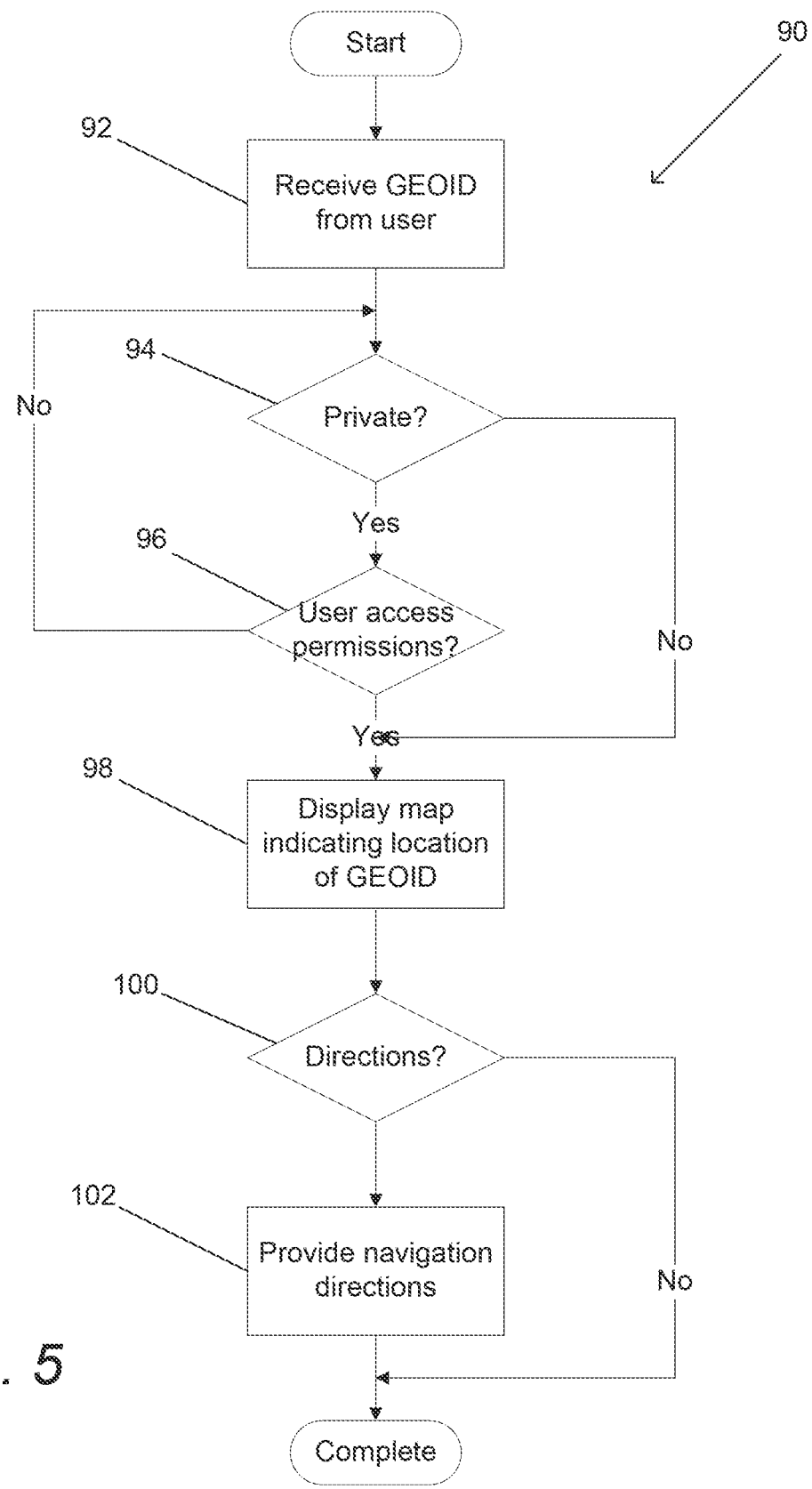
FIG. 5 is a flow chart illustrating a process for displaying a location on a map based upon a geographic identification provided by a user and optionally providing navigation directions to the geographic location in accordance with embodiments of the invention.

A process for accessing one or more geographic locations associated with a GEOID in accordance with an embodiment of the invention is illustrated in FIG. 5. The process 90 includes receiving (92) a GEOID from a user. In systems where private GEOIDs are supported, a determination (94) is made concerning whether the GEOID is private. If not, the process proceeds. In the event that the GEOID is private, then the ability of the user to access the geographic location associated with the GEOID is verified (96). The verification process can involve determining whether the user that created the GEOID has granted access permissions to the user attempting to access the GEOID. In situations where the GEOID has an associated PIN code or password, then the verification process can involve confirming the accuracy of the PIN code or password provided by the user. In situations where the access permissions are based upon a grant of permission by the user that created the GEOID to certain users or a certain class of users, the process can involve querying whether the user that provided the GEOID has been granted access permissions. In a number of embodiments, the relationships are tracked by the geographic identification system. In many embodiments, the geographic identification system can query online social networks to ascertain relationships that exist between different users. Assuming the user has permission to access the GEOID, the process proceeds.

The GEOID is used to retrieve one or more geographic locations associated with the GEOID. In the illustrated embodiment the retrieved geographic location(s) or the retrieved geographic locations closest to the user are displayed (98) on a map. In many embodiments, the map is displayed by providing the geographic location to a mapping service via an API specified by the mapping service.

Other location based services can also be offered in addition to displaying the location of the GEOID on a map. In the illustrated embodiment, the process provides the option (100) of directions between a location provided by the user, which can be performed with another GEOID, and the location of the destination GEOID. In the event that the user desires directions, the process generates navigation directions and provides (102) the directions to the user. In situations where the GEOID is a route, the process provides directions to the start of the route. In several embodiments, the directions are generated by providing the two geographic locations to a mapping service, which returns maps and directions for navigating between the two locations. Any of a variety of other location based services can also be incorporated into processes in accordance with embodiments of the invention including but not limited to location based advertising and processes associated with participation in location based social networks.

Geographic Identification and Mobility

Knowledge of the location of moving objects or entities can be useful in a host of applications including but not limited to parcel tracking, fleet management and automatic vehicle location, and location based social networks. While much of the above discussion has focused on assigning GEOIDs to static geographic locations, GEOIDs can also be assigned to mobile objects and/or entities. Mobile objects and/or entities can be collectively referred to as mobile assets. Information concerning mobile assets can be obtained in a variety of ways. Many systems already exist to track mobile assets. For example, many courier services such as Federal Express of Memphis, Tenn. provide tracking services via websites in which a unique tracking identifier is provided to a customer and the unique identifier can be used to retrieve information concerning the most recent location of a parcel. In systems such as the Fed-Ex system, location updates are provided via bar code scans of a bar code on the mobile asset. In systems such as fleet management systems, the mobile asset can include an on board GPS receiver and a radio that can be used to transmit data back to a fleet management system via a network such as a cellular phone network. An increasingly large number of mobile assets, such as mobile phones, are also able to determine their geographic location and are capable of executing applications that can send the geographic location of the mobile asset via the Internet to a remote server. Geographic identification systems in accordance with embodiments of the invention are capable of associating a GEOID to the present location of one or more mobile assets. The geographic identification system can periodically obtain a geographic location update for the mobile asset and, where possible query the mobile asset for its present location, in response to a user request. Information concerning geographic location can be retrieved from a tracking server or via communication with a client application executing on the mobile asset. Geographic information systems that can assign GEOIDs to mobile assets and provide geographic location updates for mobile assets in accordance with embodiments of the invention are discussed further below.

Geographic Identification Systems that Identify Mobile Assets

Figure 6:
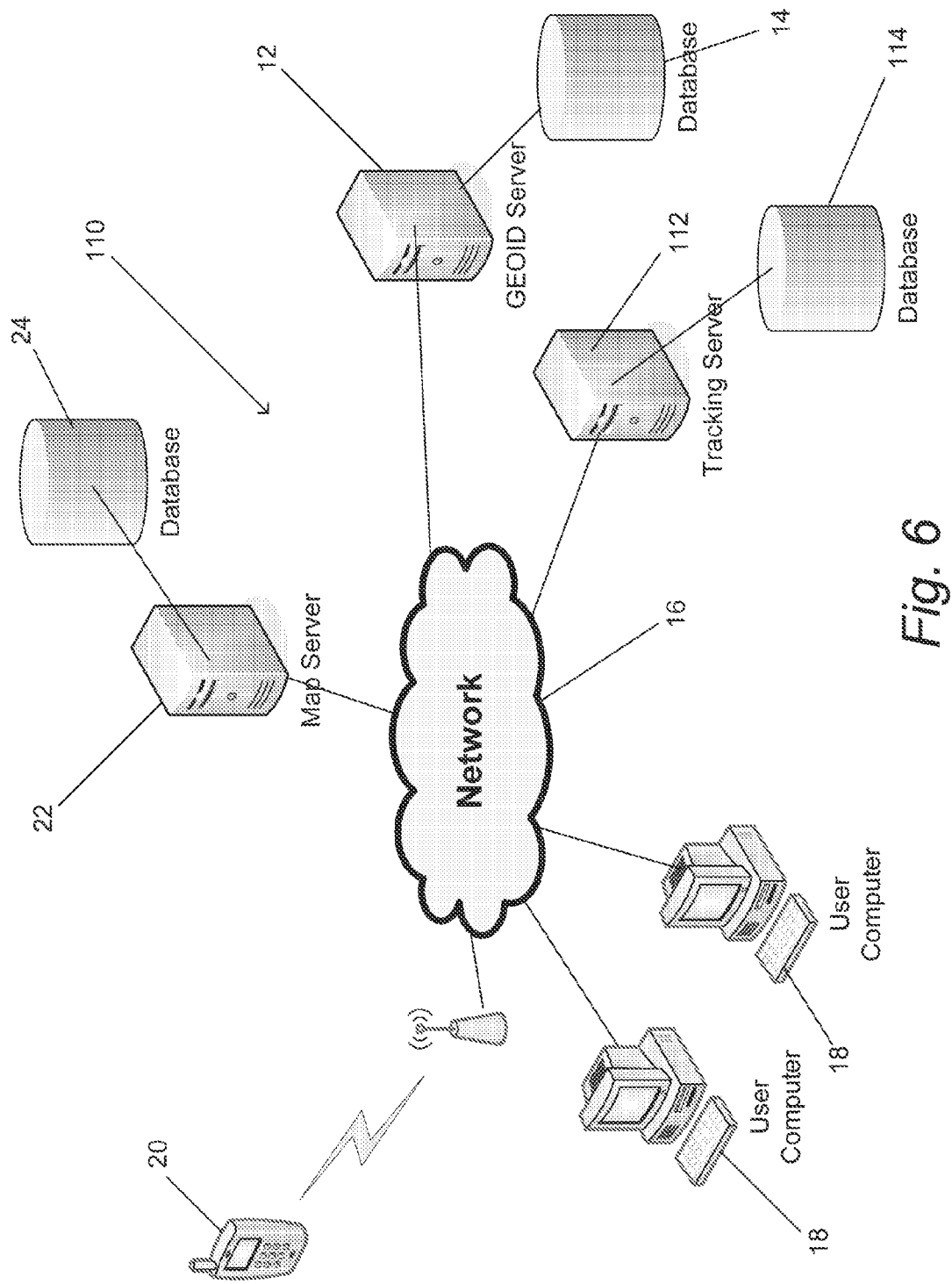
FIG. 6 illustrates the network topology of a geographic identification system that supports the assignment of mobile geographic identifications in accordance with an embodiment of the invention.

A geographic identification system that can be used to obtain the geographic location of a mobile asset in accordance with an embodiment of the invention is illustrated in FIG. 6. The geographic identification system 110 is similar to the geographic identification system 10 shown in FIG. 1 with the exception that the GEOID server 12 is configured to communicate with a tracking server 12 and client applications installed on mobile assets 20 to obtain geographic location updates. In the illustrated embodiment, the tracking server 112 is connected to a database 114 that contains geographic location information concerning one or more mobile assets. As noted above, the tracking server can obtain the geographic location information in any of a number of different ways including, but not limited to, via the aggregation of bar code reads or RFID tag reads, and/or via receiving geographic location reports from mobile assets that possess the ability to determine their geographic location and communicate the information to the tracking server 112. The information obtained from the tracking server 112 typically includes at least position information and a time stamp. In many embodiments, the tracking server can communicate with the GEOID server directly via an API. In several embodiments, the GEOID server uses other techniques for obtaining location information from tracking servers including but not limited to scraping information from web pages.

Figure 7:
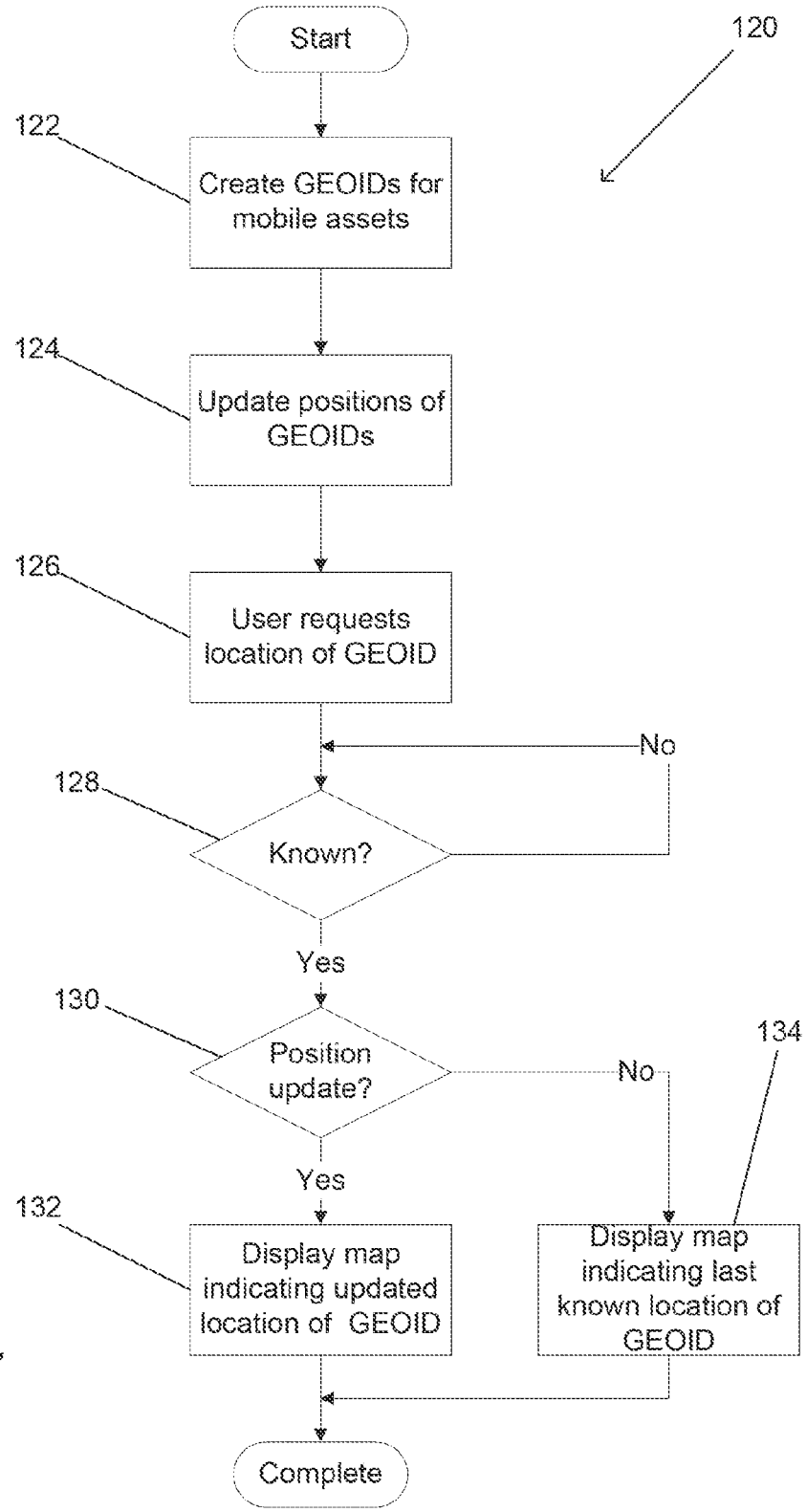
FIG. 7 is a flow chart illustrating a process for using a geographic identification system to display locations on maps of mobile objects or entities based upon mobile geographic identifications provided by users in accordance with an embodiment of the invention.

A process for assigning GEOIDs to mobile assets and for retrieving position updates for the mobile assets is illustrated in FIG. 7. The process 120 includes creating (122) GEOIDs with respect to one or more mobile assets. Over time the geographic locations of the mobile assets associated with the GEOIDs are updated (124). Depending upon the specific application, the updates may be driven by a geographic identification system querying a tracking server and/or a mobile asset after a predetermined period of time and/or the mobile asset may notify the geographic identification system of significant changes of geographic location (e.g. when a mobile phone moves from one mobile communication cell to another). When a user requests (126) the location of a GEOID assigned to a mobile asset, the process determines (128) whether the GEOID is known and/or whether the user has appropriate access permissions. In the event that the GEOID is known and/or the user has the appropriate access permissions, the process determines (130) whether a position update for the mobile asset is available. In several embodiments, a geographic identification system can obtain position updates by querying a tracking server and/or by directly querying the mobile asset. In the event that a position update is obtained, a map indicating the updated geographic location of the one or more mobile assets associated with the GEOID is displayed (132). When a position update cannot be obtained for any of the mobile assets, the last known geographic location of the mobile asset is displayed (134) instead.

Although the GEOID server 12 is shown as communicating with both tracking servers 112 and mobile assets 20, GEOID servers in accordance with embodiments of the invention can be limited to communicating with tracking servers only or mobile assets only. In addition, geographic identification systems in accordance with embodiments of the invention can retrieve more than just geographic location information from tracking servers and client applications on mobile assets. Geographic identification systems can retrieve additional information including, but not limited to, status information concerning the mobile asset, historical information concerning a mobile asset, and/or information from sensors connected to the mobile asset. Processes for assigning GEOIDs to mobile assets and obtaining geographic location updates for mobile assets are discussed further below.

Assigning GEOIDs to Mobile Assets

Figure 8:
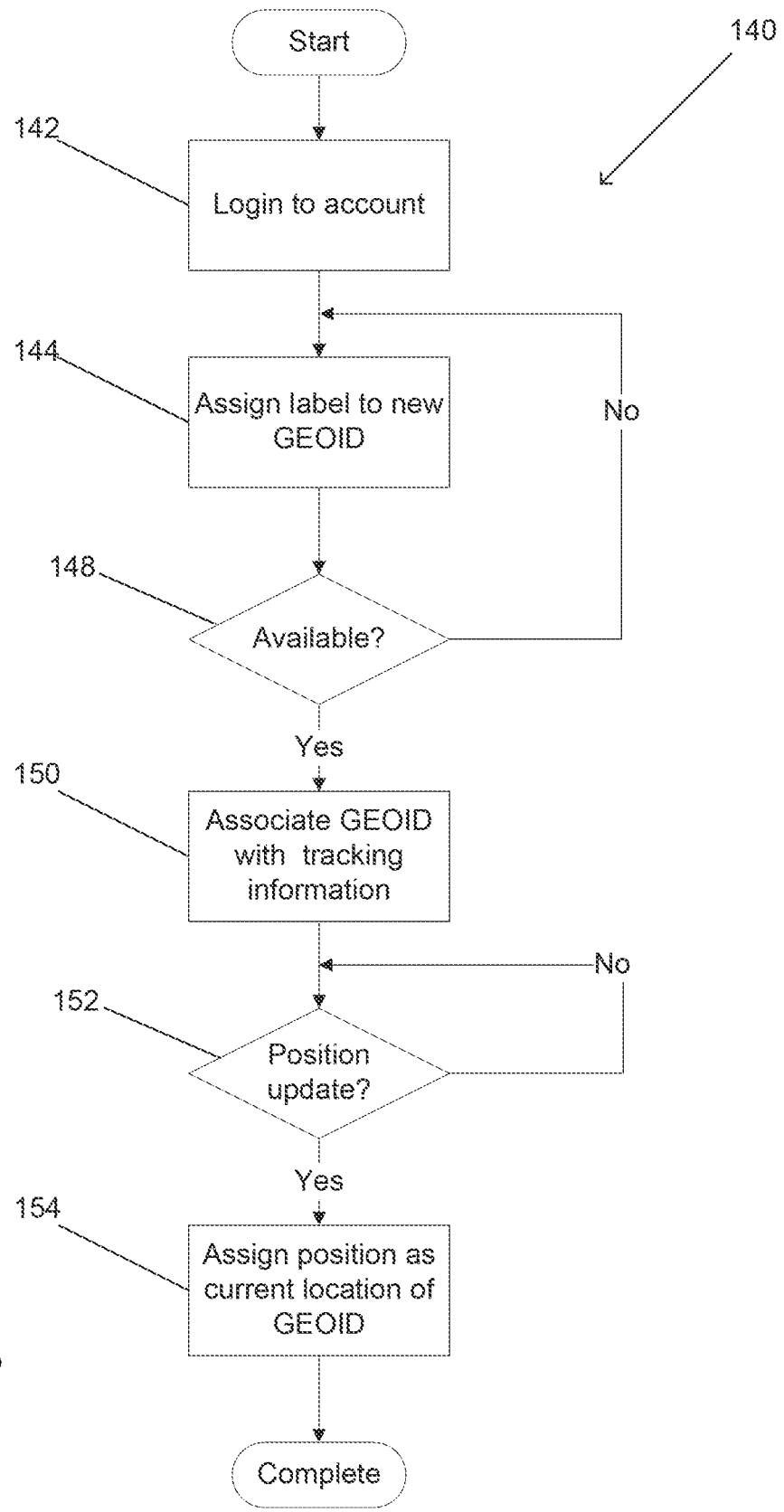
FIG. 8 is a flow chart illustrating a process for assigning a mobile geographic identification to a uniquely identified object or entity within a tracking system in accordance with an embodiment of the invention.

A process for associating a GEOID to one or more mobile assets, where geographic location information concerning the mobile assets is obtained via a tracking server, in accordance with an embodiment of the invention is illustrated in FIG. 8. The process 140 includes logging (142) into an account and assigning (144) a label to a GEOID. As noted above, a user need not register in order to assign GEOIDs. The label of the GEOID can be assigned in any of the manners outlined above with respect to GEOIDs assigned to static locations including but not limited to allowing the user to assign the label, or enabling a geographic identification system to automatically generate a label. A specific example of an automatically assigned label can occur where a location based social network assigns the user ID of a member of the online social network as a GEOID label identifying the location of a mobile asset such as a mobile phone associated with the user's account on the location based social network, which enables the geographic location of the mobile asset to be efficiently provided in contexts other than the location based social network using the user's user ID (e.g. provided using the GEOID label on a public short messaging network such as the Twitter service provided by Twitter, Inc. of San Francisco). In the illustrated embodiment, the process determines (148) whether the assigned label is available. Assuming the label is available, tracking information is provided for association (150) with the GEOID. The tracking information is typically sufficient to enable a geographic identification system to retrieve geographic location updates from a tracking server that tracks the geographic location of the mobile asset in question. The process attempts to use the tracking information to determine (152) whether a position update is available for the mobile asset. In the event that a position update is available, then the geographic location of the mobile asset along with a time stamp are associated (154) with the GEOID in a database of GEOIDs.

Figure 9:
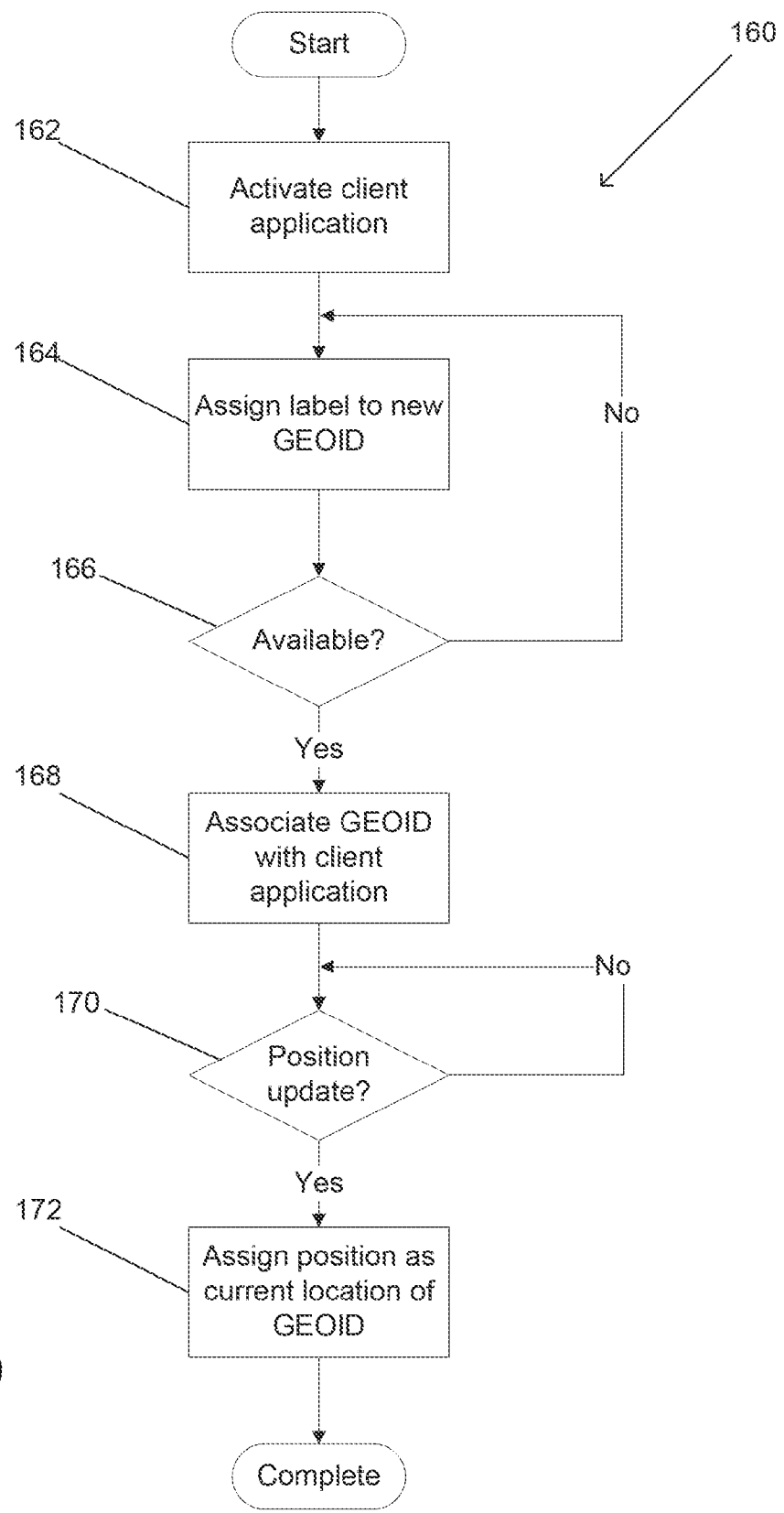
FIG. 9 is a flow chart illustrating a process for assigning a mobile geographic identification to a mobile device using a client application installed on the mobile device in accordance with an embodiment of the invention.

A process for associating a GEOID with one or more mobile assets, where the mobile assets are configured to report their geographic locations directly to a geographic identification system, in accordance with an embodiment of the invention is illustrated in FIG. 9. The process 160 includes activating (162) a client application resident on the mobile asset and assigning (164) a label to the GEOID of the mobile asset. The label can be assigned in any of the manners outlined above with respect to GEOIDs assigned to static locations including but not limited to allowing the user to assign the label, enabling a geographic identification system to automatically generate a label. In the illustrated embodiment, the process determines (148) whether the assigned label is available. Assuming the label is available, the GEOID is associated (168) with the specific client application. The process of associating the GEOID with the client application can involve providing a unique ID, token or key to the client so that the client application can uniquely identify itself to a geographic identification system. The process then determines (170) whether the client application is capable of providing a position update. In the event that the client application is able to determine the position of the mobile asset, the geographic location of the mobile asset and an associated time stamp are assigned (172) to the GEOID.

Although specific processes are illustrated in FIGS. 8 and 9 for creating GEOIDs that are associated with one or more mobile assets, any of a variety of processes can be used including processes hosted on the tracking servers or other servers provided by the entity tracking the mobile assets, where the processes create GEOIDs via an API or other mechanism with a geographic identification system to facilitate the tracking of the mobile assets via a mapping service. Furthermore, tracking information can be provided that enables a number of mobile assets to be loaded into a geographic identification system in batch with separate GEOIDs assigned to individual mobile assets or groups of mobile assets. For example, all vehicles in a fleet management system could be loaded into a geographic identification system or all parcels shipped in a given window of time could be uploaded into the geographic identification system and assigned GEOIDs. Furthermore, GEOIDs for mobile assets can include the same security and/or privacy restrictions described above with respect to GEOIDs assigned to static geographic locations.

Retrieving Location of Mobile Assets using GEOIDs

Figure 10A:
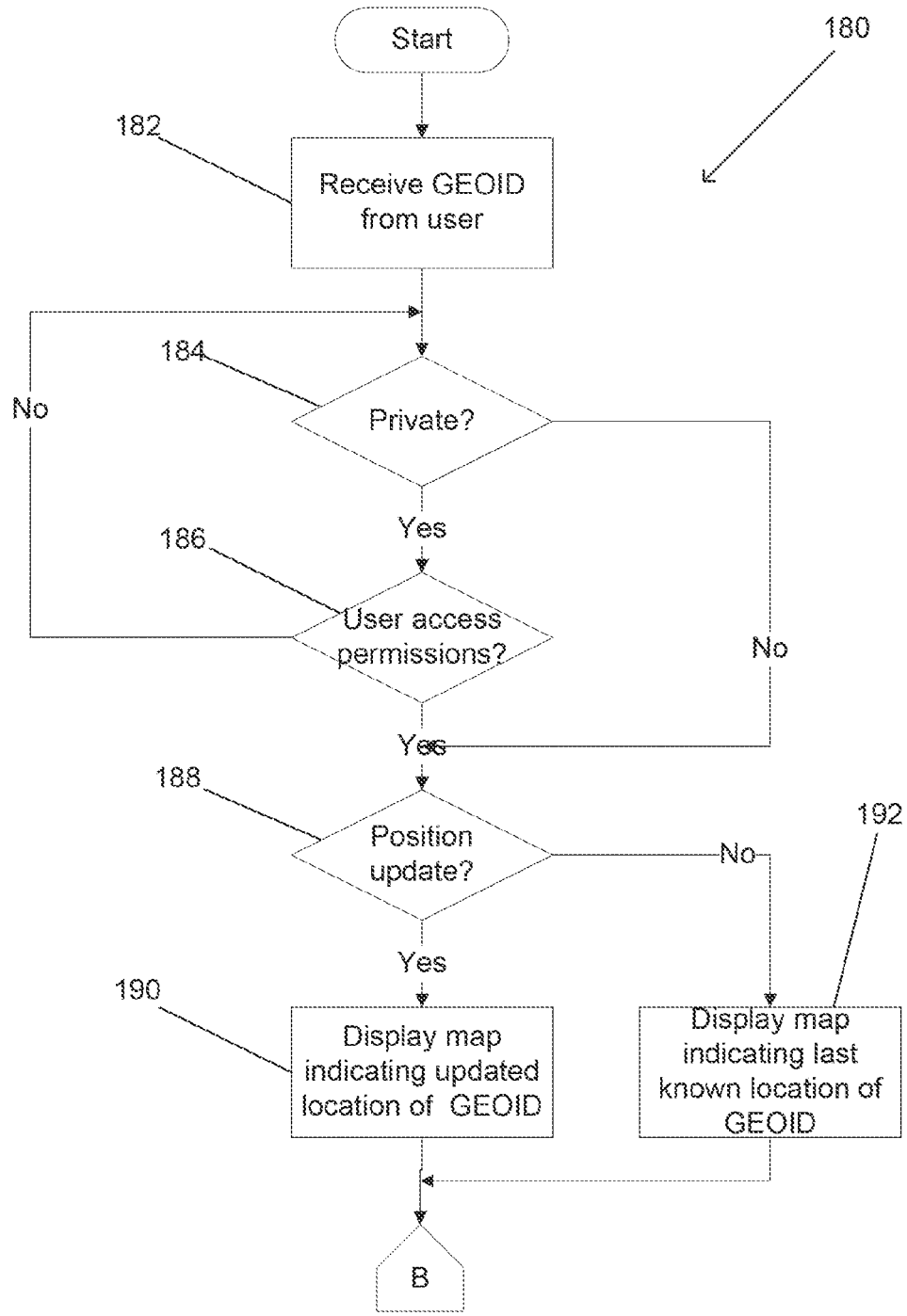
FIGS. 10a and 10b are flow charts illustrating a process for displaying a location on a map of a mobile object or entity based upon a geographic identification provided by a user and optionally providing navigation directions to the geographic location in accordance with embodiments of the invention.
Figure 10B:
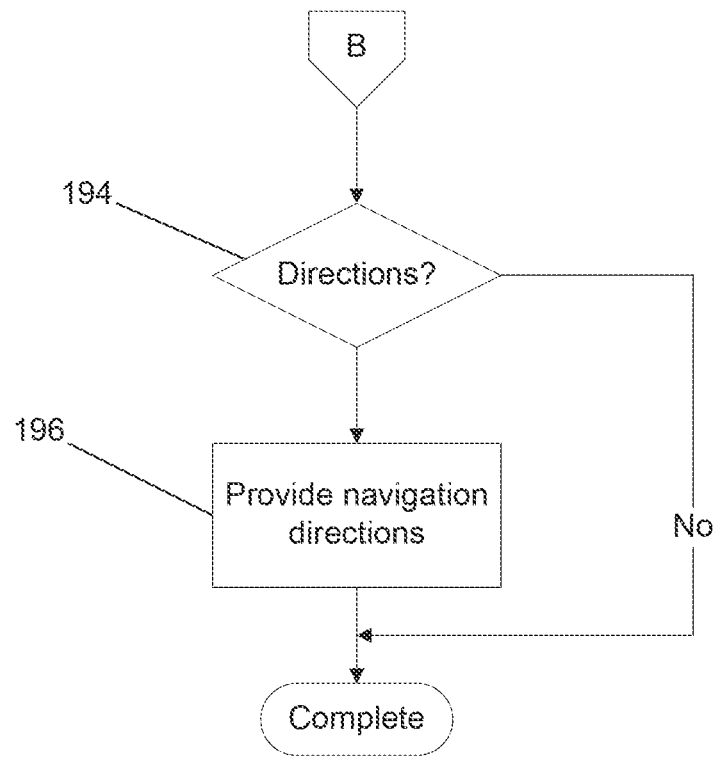

A process for retrieving the location of one or more mobile assets associated with a GEOID in accordance with embodiments of the invention is illustrated in FIGS. 10a and 10b. The process 180 includes receiving (182) a GEOID from a user and determining (184) whether the GEOID is valid and/or whether the user has the appropriate access permissions (186) to receive information concerning the GEOID. In the event the user has the appropriate permissions to retrieve information associated with a valid GEOID, a determination (188) is made concerning whether a position update is available with respect to any of the mobile assets associated with the GEOID. In the event that a position update is available, the present geographic location of the mobile asset is displayed on a map. In the event that a position update is not available, then the last known location of the mobile asset is displayed (192). In many embodiments, the icon used to display the location of the mobile asset is configured to indicate whether the location is a current update or the last known location. The icon can also indicate the age of the last known location.

In addition to displaying the geographic location of the mobile assets associated with the GEOID, processes in accordance with embodiments of the invention can involve providing additional location based services including but not limited to providing directions to the mobile asset. In the illustrated embodiment, the process determines (194) whether directions are requested and provides (196) navigation directions where appropriate.

Although a specific process is illustrated in FIGS. 10*a* and 10*b* for retrieving geographic location information for mobile assets associated with one or more mobile assets, any of a variety of processes including processes that do and/or do not offer location based services can be utilized in accordance with embodiments of the invention. Furthermore, processes in accordance with embodiments of the invention can be utilized to assign GEOIDs to one or more static geographic locations and/or mobile assets, and to retrieve the geographic location of the static locations and/or mobile assets associated with GEOIDs in accordance with embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A geographic labeling system to retrieve mapping information, comprising:
   a GEOID server configured to communicate with a database containing a plurality of GEOID labels and geographic information assigned to each GEOID label;
   wherein the each piece of geographic information is longer than the GEOID label to which it is assigned;
   an originating user device configured to create and communicate a new GEOID label to the GEOID server before geographic information is assigned to the new GEOID label;
   the GEOID server is further configured to check and confirm that the new GEOID label is not included in the database containing a plurality of GEOID labels;
   the GEOID server is further configured to communicate back to the originating device confirming availability of the new GEOID label;
   the originating user device is further configured to communicate a set of geographic information to be assigned to the new GEOID label to the GEOID server;
   the GEOID server is configured to communicate to the database and add the new GEOID label and its assigned geographic information to the database;
   a plurality of user devices configured to communicate both with the originating user device and the GEOID server;
   wherein the originating user device is configured to communicate the GEOID label without any additional geographic information to at least one of the plurality of user devices;
   then at least one of the plurality of user devices is configured to communicate the GEOID label without any additional geographic information to the GEOID server;
   wherein the said GEOID server is further configured to communicate with a mapping server via a network;
   wherein the GEOID server is configured to retrieve geographic information from the database in response to a GEOID label received from a user device via the network; and
   wherein the GEOID server is configured to cause the display of at least one piece of the assigned geographic information provided by the mapping server on a user device in response to the GEOID label received from the user device.

2. The geographic labeling system of claim 1, wherein the geographic information is expressed as a latitude and longitude on the surface of the Earth.

3. The geographic labeling system of claim 1, wherein the piece of geographic information is longer than the label.

4. The geographic labeling system of claim 1, wherein the geographic information is expressed as a street address comprising a street address and a postal code.

5. The geographic labeling system of claim 1, wherein the geographic information of at least one GEOID is a route.

6. The geographic labeling system of claim 5, wherein the mobile asset is a mobile phone handset.

7. The geographic labeling system of claim 5, wherein the mobile asset is a vehicle including an automatic vehicle location system.

8. The geographic labeling system of claim 7, wherein the mobile asset includes a client application configured to determine the current location of the mobile asset and to communicate the current location of the mobile asset to the GEOID server.

9. The geographic labeling system of claim 5, wherein the GEOID server is configured to use the retrieved geographic information to obtain a location update for the mobile asset.

10. The geographic labeling system of claim 9, wherein:
    the GEOID server is configured to communicate with a tracking server via the network;
    wherein the GEOID server is configured to obtain a location update for the mobile asset from the tracking server using the retrieved geographic information.

11. The geographic labeling system of claim 1, wherein the geographic information of at least one GEOID is information identifying a mobile asset.

12. The geographic labeling system of claim 1, wherein the geographic information of at least one GEOID is information identifying a plurality of mobile assets.

13. The geographic labeling system of claim 1, wherein the geographic information of at least one GEOID is references another GEOID.

14. The geographic labeling system of claim 13, wherein the GEOID server is configured to compare a PIN code received from the user device to a PIN code associated with the GEOID in the database.

15. The geographic labeling system of claim 13, wherein the GEOID server is configured to determine whether the user device from which the GEOID label is received is associated with a user that has been assigned permission to access the geographic information associated with the GEOID by the user that created the GEOID.

16. The geographic labeling system of claim 1, wherein the GEOID server is configured to verify that the user device from which a GEOID label is received has permission to access the geographic information associated with the GEOID label.

17. The geographic labeling system of claim 1, wherein the GEOID expires after a predetermined time period.

18. The geographic labeling system of claim 1, wherein at least one GEOID comprises at least one set of non-geographic information in addition to the geographic information.

19. The geographic labeling system of claim 1, wherein the originating user device is configured to provide said GEOID label to other user devices.

\* \* \* \* \*